Jan. 23, 1968   W. FRIEDRICH   3,364,583
METHOD AND APPARATUS FOR THE CONTINUOUS TREATMENT OF GRANULAR
AND/OR POWDERED MATERIAL WITH STEAM AND/OR GAS
Filed Jan. 26, 1965
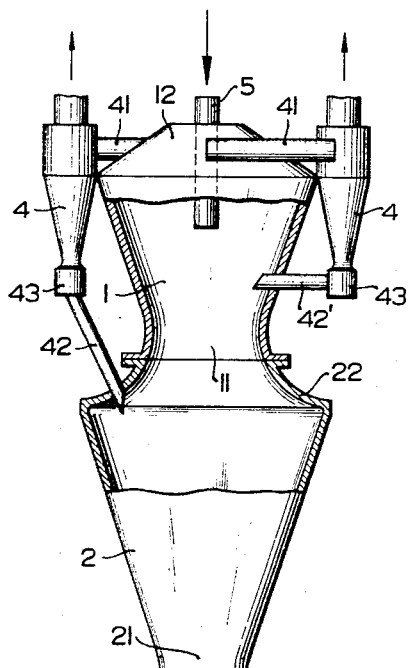
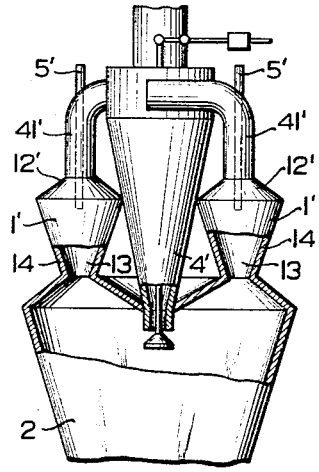
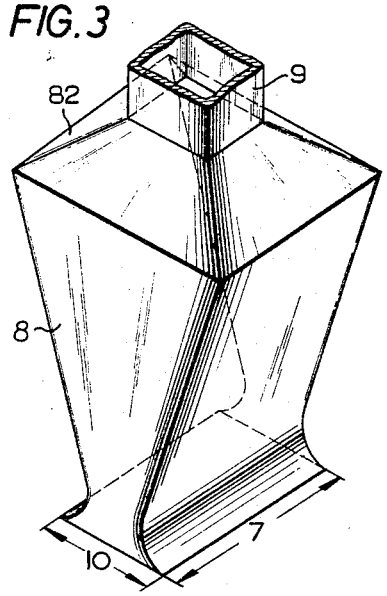
Inventor.
Wolfgang Friedrich.
By Lee & Lee
Attys.

United States Patent Office 3,364,583
Patented Jan. 23, 1968

3,364,583
METHOD AND APPARATUS FOR THE CONTINUOUS TREATMENT OF GRANULAR AND/OR POWDERED MATERIAL WITH STEAM AND/OR GAS
Wolfgang Friedrich, Braunschweig, Germany, assignor to Miag Muhlenbau und Industrie G.m.b.H., Braunschweig, Germany, a German company
Filed Jan. 26, 1965, Ser. No. 428,169
Claims priority, application Germany, Jan. 31, 1964, M 59,757
2 Claims. (Cl. 34—10)

The invention relates to a method of continuously treating granular and/or powdered material with steam and/or gas which rises vertically with deceleration against a downward stream of continuously fed material at a speed exceeding the floating speed, the material being fed at such a rate that clouds of material are formed which have an independent flow behaviour and which on attaining sufficient density drop through the point of maximum gas velocity, in succession, to be successively removed.

The gas for treating the material flows upwardly through the apparatus for carrying out the method, which apparatus comprises a downwardly tapering vertical tank with a nozzle at the bottom and outlets for the gas and inlets for the material at the top, the gas then passing ino a separator in which the gas is freed of entrained material, which is then recirculated to the vertical tank.

In some uses of the present method it is necessary to recirculate the material several times, that is, it is necessary to remove the material from the tank with the tank, to separate it from the gas and then to return it to the tank in order to achieve the requisite duration of pretreatment. This makes it necessary to use a very extensive separating plant if large quantities of circulating material are to be treated in the desired manner. When the separating system is large there is the further disadvantage that the gas passing therethrough loses pressure.

According to the invention a method is proposed for overcoming these disadvantages which comprises causing the clouds of material successively dropping out of the vertical tank to pass into another rising flow of gas.

The invention further includes suitable apparatus for carrying out this method.

The material is fed into the upper vertical tank, where it is treated by the gas until a cloud of material forms and drops through the nozzle of the upper tank to pass into the next or bottom vertical tank, where it is further intensively treated until it drops out of the second tank to pass either into a third vertical tank or to a station for treatment of a different nature.

The invention is further described with reference to embodiments illustrated in the accompanying drawings, in which:

FIG. 1 is an elevation of an assembly of three vertical tanks in superposition;

FIG. 2 is a fragmentary elevation of an assembly according to another embodiment of the invention, in which several upper vertical tanks, connected in parallel, are used in place of a single upper vertical tank; and FIG. 3 is a perspective representation of a processing tank of polygonal cross-section.

Referring to FIG. 1, the apparatus for carrying out the method of the invention comprises three superposed vertical tanks 1, 2 and 3. Each of these vertical tanks tapers downwardly to terminate in a nozzle 11, 21, and 31 respectively. The upper vertical tank 1 is closed by a cover 12 in the form of a hollow frustum. A plurality of separators 4, connected in parallel, are provided whose intake conduits 41 are connected to the cover 12. In the center of the cover 12 there is disposed an admission pipe 5 for the untreated material.

The second vertical tank 2 has a cover 22 which has a large central opening over which the nozzle 11 of the tank 1 fits. The material separated in the separators 4 is collected in sluices 43 and passes through spouts 42 to be returned to the processing apparatus. It is in most cases possible for the spouts 42 to pass through the cover 22 and thus guide the recirculated material into the second vertical tank 2, as the thorough pretreatment which is provided in the upper vertical tank 1 is usually sufficient, particularly if the treatment provided in the second tank 2 is to be followed by further treatment in a third tank 3. This possibility is illustrated on the left hand side of FIG. 1. In some cases, however, it may be necessary for the material to be recirculated into the upper vertical tank 1, as illustrated on the right hand side of FIG. 1.

The second vertical tank 2 rests on the cover, designated by 32, of the tank 3, the nozzle 21 fitting over a central opening in the cover 32. The pretreatment of the material is completed in the tank 3, from which the material passes, via the nozzle 31, to an apparatus 6 for treatment of a different nature.

FIG. 1 shows that the cross-section of the nozzles 11, 21 and 31 decreases progressively from top to bottom of the assembly. This arrangement is suitable in the case where the temperature of the gas or steam does not substantially change as it rises through the successive tanks 3, 2 and 1. In cases where the gas temperature does substantially change as the gas rises in the assembly the difference in cross-section of the nozzle will not be pronounced. In some cases the effect of the temperature change may even exceed that of the different nozzle cross-sections so that the cross-sectional area of the nozzles may increase from top to bottom whilst the velocity of the gas still decreases as it rises in the assembly. It is advantageous for the velocity of the gas to decrease as the latter rises in the assembly, since this reduces the tendency of the gas to entrain a large proportion of the material during the upward movement of the gas. Thus the influence of the material entrained towards the top, where the untreated material is admitted, is reduced and it is possible to employ small separators.

In FIG. 1 a plurality of separators 4 are disposed around the upper vertical tank 1, but in the embodiment shown in FIG. 2 there is the reverse arrangement, that is, a plurality of vertical tanks 1' are disposed around a single separator 4' which is arranged in the centre line of the second vertical tank 2' and which discharges the recirculated material into the tank 2'. The untreated material is fed through admission pipes 5' to the vertical tanks 1' whose covers 12' have centrally connected suction conduits 41' which are connected to the separator 4'. The separator 4' is equipped in the manner described in the main patent. This arrangement normally makes it possible to decrease the overall height of the assembly.

Further progress in this direction may be made by making the upper or uppermost vertical tank or tanks annular, the line 13 representing the generatrix of the inner wall of said annular tank and the line 14 representing the generatrix of the outer wall thereof. The cross-sectional representation of the arrangement shown in FIG. 2 is not changed by this alternative possibility. The above-described annular tank may have a plurality of contiguous and overlapping covers 12', each cover being fitted with a gas discharge pipe 41'. In some cases the top vertical tank need not be in the form of a continuous ring but may comprise a plurality of vertical tanks, for example two, which are in the form of a circular ring sector and somewhat resemble a shell in appearance. The nozzle of such a tank has a polygonal, in fact a rectangular cross-section of which two of the sides are curved, or in other words, the cross-section has the form of a circular ring sector.

From this arrangement may be developed the conception of making the vertical tanks not round but polygonal, particularly quadrangular and preferably rectangular, the defining cross-sectional lines being straight. This embodiment is shown in perspective in FIG. 3. It provides a simple means of repeatedly carrying out a once tried process for the treatment of material under the same conditions and independently of the quantity of material passed through, per unit of time. It is simply necessary to make the length 7 of the tank 8 shown in FIG. 3 such that the tank can cope with the desired rate of flow of the material. The tank 8 has a cover 82 which may be connected to a quadrangular conduit 9 or, in a manner similar to that illustrated in FIG. 1, may be connected to a nozzle of a superposed vertical tank resembling the tank shown in FIG. 3 but differing therefrom mainly in the width 10 of the nozzles.

It is normally convenient for the gas discharge conduits 9 leading to the separators to have a rectangular cross-section. If it is advantageous, however, to use round pipes for this purposes, the rectangular nozzle cross-section shown in FIG. 3 can merge into a round tank whose cover is connected to a round pipe. This possibility is not shown.

This change in cross-section requires more complicated manufacturing technique, but the shape produced has no detrimental effect on the process, as it is in fact desirable to avoid stationary flow conditions in the vertical tanks in the interests of forming a cloud of material in a state of maximum turbulence.

Changes may be made within the scope and spirit of the appended claims which define what is believed to be new and desired to have protected by Letters Patent.

I claim:

1. Apparatus for the continuous treatment of granular and/or powdered material with a fluid such as steam and/or gas, comprising at least one vertical tank which tapers downwardly, terminating at the lower end thereof in a nozzle and having in the upper end thereof a fluid discharge opening, means operatively connected with each such tank for supplying thereto material to be treated, at least one further vertical tank terminating at the lower end thereof in a nozzle, and having in the upper end thereof a fluid discharge opening, each further tank being arranged in superposition below said first tank with its fluid discharge opening in serial communication with the nozzle of the preceding tank, the nozzle of the lowermost tank forming the inlet for the treating fluid, the respective nozzle cross-sections being so successively dimensioned from top to bottom that the rising fluid is alternately accelerated and decelerated, with the velocity of the rising fluid immediately following each acceleration becoming progressively less as the fluid rises, and a plurality of separators disposed laterally around said top tank for withdrawing material from the fluid discharged through the fluid discharge opening of the top tank and arranged to discharge withdrawn material into a tank disposed below said top tank

2. A method for continuous treatment of granular and finely divided particles of material in a counter-flowing highly compressible fluid flowing upwardly, in which such material is treated without essential change as to form and weight of the particles, comprising the steps of effecting continuous flow of the fluid in an upward direction with such fluid rising with decreasing velocity, alternately decelerating and accelerating such fluid as it rises, introducing said material into said fluid flow in a direction counter to said fluid flow, continuously maintaining the velocity of said fluid at a rate higher than that required to maintain suspension of the material particles, controlling the amount of material added per unit of time to the fluid to effect a compression of such material and thereby form successive clouds which reach a density sufficient to fall through an intermediate area of fluid acceleration to a much larger area adjacent thereto, thus falling into another decelerating flow of fluid, passing the respective clouds of material through at least one additional intermediate area of fluid acceleration to a much larger area adjacent thereto, thus falling into at least one additional deceleration flow of fluid, with the maximum velocity becoming progressively less as the fluid stream rises, and thereafter removing the material from said fluid.

References Cited

UNITED STATES PATENTS

| | | | |
|---|---|---|---|
| 2,659,587 | 11/1953 | Bowen | 34—57 |
| 2,663,560 | 12/1953 | Muller et al. | 263—32 X |
| 2,866,625 | 12/1958 | Sylvest | 34—57 |
| 3,067,990 | 12/1962 | Zacpal | 263—32 |
| 3,083,472 | 4/1963 | Helming | 34—57 |
| 3,135,588 | 6/1964 | Helming | 34—57 |
| 3,140,862 | 7/1964 | Schoppe | 34—10 X |
| 3,207,494 | 9/1965 | Jager | 263—32 |
| 3,265,775 | 8/1966 | Friedrich | 263—32 |

FREDERICK L. MATTESON, Jr., *Primary Examiner.*

J. J. CAMBY, *Assistant Examiner.*